United States Patent
Qian et al.

(10) Patent No.: US 8,000,604 B2
(45) Date of Patent: Aug. 16, 2011

(54) ORTHOGONAL FREQUENCY DIVISION MULTIPLE ACCESS (OFDMA) BASED PASSIVE OPTICAL NETWORK (PON) ARCHITECTURE AND ITS EXTENSION TO LONG DISTANCE

(75) Inventors: Dayou Qian, Cranbury, NJ (US); Junqiang Hu, Davis, CA (US); Jianjun Yu, Stone Mountain, GA (US); Philip Nan Ji, Princeton, NJ (US); Lei Xu, Princeton, NJ (US); Ting Wang, Princeton, NJ (US); Milorad Cvijetic, Herndon, VA (US); Toshihiko Kusano, Toyko (JP)

(73) Assignees: NEC Laboratories America, Inc., Princeton, NJ (US); NEC Corporation (JP)

(*) Notice: Subject to any disclaimer, the term of this patent is extended or adjusted under 35 U.S.C. 154(b) by 731 days.

(21) Appl. No.: 12/039,981

(22) Filed: Feb. 29, 2008

(65) Prior Publication Data
US 2008/0267630 A1 Oct. 30, 2008

Related U.S. Application Data

(60) Provisional application No. 60/894,982, filed on Mar. 15, 2007.

(51) Int. Cl.
*H04J 14/02* (2006.01)
(52) U.S. Cl. ............... 398/89; 398/63; 398/66; 398/69; 398/75; 398/79; 398/100; 370/203; 370/210; 370/485; 370/537
(58) Field of Classification Search .............. 398/58–89, 398/98–102; 370/203, 210, 485, 537; 375/260–316
See application file for complete search history.

(56) References Cited

U.S. PATENT DOCUMENTS

| | | | | |
|---|---|---|---|---|
| 7,069,577 B2* | 6/2006 | Geile et al. | | 725/106 |
| 7,230,908 B2* | 6/2007 | Vanderaar et al. | | 370/203 |
| 7,469,106 B2* | 12/2008 | Feced et al. | | 398/202 |
| 7,471,903 B1* | 12/2008 | Friskney et al. | | 398/185 |
| 7,580,630 B2* | 8/2009 | Kee et al. | | 398/25 |
| 2002/0041637 A1* | 4/2002 | Smart et al. | | 375/316 |
| 2002/0109892 A1* | 8/2002 | Seto et al. | | 359/180 |
| 2003/0026201 A1* | 2/2003 | Arnesen | | 370/210 |
| 2005/0074037 A1* | 4/2005 | Rickard et al. | | 370/537 |
| 2006/0002706 A1* | 1/2006 | Lee et al. | | 398/71 |
| 2007/0121745 A1* | 5/2007 | Zuckerman et al. | | 375/260 |
| 2007/0177873 A1* | 8/2007 | Hyun et al. | | 398/72 |
| 2007/0189770 A1* | 8/2007 | Sucharczuk et al. | | 398/66 |
| 2007/0195823 A1* | 8/2007 | Biegert | | 370/485 |
| 2009/0169213 A1* | 7/2009 | Lowery et al. | | 398/98 |
| 2009/0220239 A1* | 9/2009 | Armstrong et al. | | 398/81 |

OTHER PUBLICATIONS

Sargis et al: "10-Gb/s Subcarrier Multiplexed Transmission Over 490 km of Ordinary Single-Mode Fiber Without Dispersion Compensation", IEEE Photonics Technology Letters, vol. 9, No. 12, Dec. 1997, pp. 1658-1660.*
Hui et al: "Subcarrier Multiplexing for High-Speed Optical Transmission", J. LightWave Technology, vol. 20, No. 3, Mar. 3, 2002, pp. 417-427.*

* cited by examiner

*Primary Examiner* — Li Liu
(74) *Attorney, Agent, or Firm* — James Bitetto; Joseph Kolodka

(57) ABSTRACT

A passive optical network (PON) device, system and method include an optical line terminal (OLT) receiver configured to receive multiple signals at different wavelengths simultaneously and enable multiple transmitters to operate at the same time during one upstream time slot. The optical line terminal employs Orthogonal Frequency Division Multiple Access (OFDMA) to transparently support a plurality of applications and enable dynamic bandwidth allocation among these applications where the bandwidth is allocated in two dimensional frequency and time space.

14 Claims, 4 Drawing Sheets

ORTHOGONAL FREQUENCY DIVISION MULTIPLE ACCESS (OFDMA) BASED PASSIVE OPTICAL NETWORK (PON) ARCHITECTURE AND ITS EXTENSION TO LONG DISTANCE

RELATED APPLICATION INFORMATION

This application claims priority to provisional application Ser. No. 60/894,982 filed on Mar. 15, 2007, incorporated herein by reference.

BACKGROUND

1. Technical Field

The present invention relates to optical networks and more particularly to system and methods that employ orthogonal frequency division multiple access (OFDMA) based passive optical network (PON) architecture to achieve a high data rate over long distances.

2. Description of the Related Art

With the wide deployment of GE-PON (Gigabit Ethernet Passive Optical Network) and G-PON (Gigabit PON) systems, research and development for the access networks is focused on the next generation PON systems such as 10 G-PON and wavelength division multiplexed PON (WDM-PON). The carriers in these systems require the ability to provide heterogeneous services such as legacy TDM (Time Division Multiplexing, e.g., T-1) over the constructed access networks to protect investment.

TDM-based GE-PON and 10 G-PON networks need complex scheduling algorithms and framing technology to support different applications. In addition, 10 G-PON systems also require relatively expensive 10 Gb/s components that increase the system costs and make it more difficult to have transmission over an extended reach (e.g., 80 km to 100 km and beyond). WDM-PON also lacks the flexibility to dynamically allocate the bandwidth among optical network units (ONUs).

SUMMARY

A passive optical network (PON) device, system and method include an optical line terminal (OLT) receiver configured to receive multiple signals at different wavelengths simultaneously and enable multiple transmitters to operate at the same time during one upstream time slot. The optical line terminal employs Orthogonal Frequency Division Multiple Access (OFDMA) to transparently support a plurality of applications and enable dynamic bandwidth allocation among these applications where the bandwidth is allocated in two dimensional frequency and time space.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with present principles, a passive optical network (PON) architecture is provided which employs Orthogonal Frequency Division Multiple Access (OFDMA) to transparently support various applications and enable dynamic bandwidth allocation among these applications. In addition, an optical line terminal (OLT) receiver is simplified to a single unit that can receive multiple signals at different wavelengths simultaneously. One embodiment enables multiple transmitters to operate at the same time during one upstream time slot. It was experimentally demonstrated that 10 Gb/s bidirectional operation was achieved using 2.5 GHz components to validate the architecture feasibility, and to verify longer reach capability by achieving 100 km transmission using a directly modulated laser (DML) without dispersion compensation.

Embodiments described herein may be entirely hardware, or include both hardware and software elements. In a preferred embodiment, the present invention is implemented in hardware with software elements. Software includes but is not limited to firmware, resident software, microcode, etc.

It is to be understood that the present embodiments are described in terms of a passive optical network (PON); however, other networks, optical or otherwise, are contemplated and may benefit from the present teachings. While the FIGS. show illustrative optical hardware configurations, these configurations may be reconfigured or combined to provide functionality within the scope of the present principles.

Figure 1:
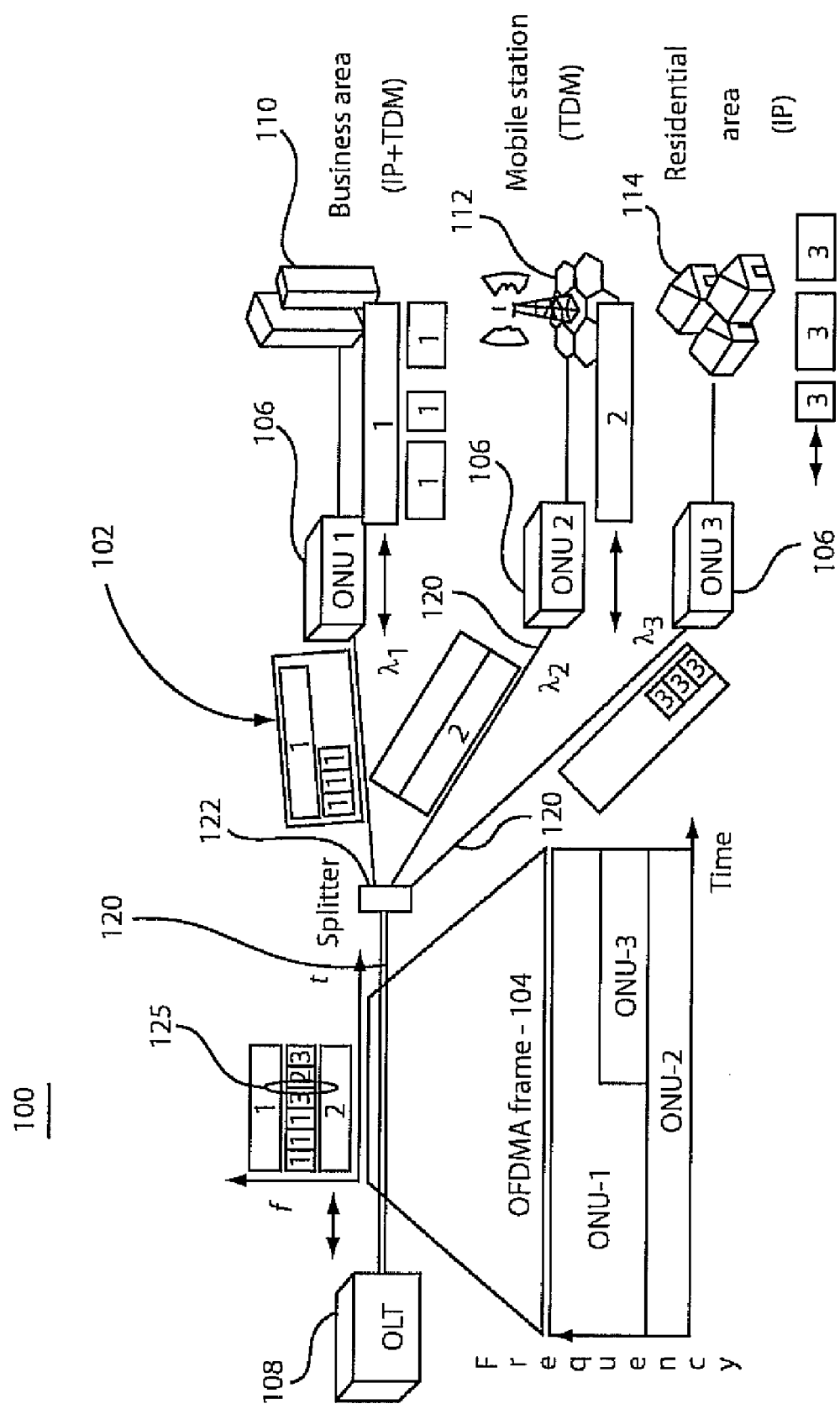
FIG. 1 is a diagram showing an illustrative passive optical network architecture for a system and method for Orthogonal Frequency Division Multiple Access (OFDMA) in accordance with one exemplary embodiment.

Referring now to the drawings in which like numerals represent the same or similar elements and initially to FIG. 1, a network architecture 100 is illustratively depicted in accordance with one exemplary embodiment showing an Orthogonal Frequency Division Multiple Access (OFDMA) passive optical network (PON) (OFDMA-PON) system 102, and traffic flow. The OFDMA-PON 102 is based on simultaneous orthogonal sub-carrier transmission realized by, e.g., an inverse fast Fourier transform (IFFT) and a fast Fourier transform (FFT). The OFDMA includes a hybrid technique, which combines Orthogonal Frequency Division Modulation (OFDM) and Time Division Multiple Access (TDMA), where users are dynamically assigned sub-carriers (OFDM) in different time slots (TDMA). Modulated data streams are orthogonal to each other in the frequency domain, meaning that cross-talk between the sub-channels is eliminated. Unlike OFDM in which all the sub-carriers are used by a single user at a time, in OFDMA, users share both sub-carriers and time slots.

The architecture 100 uses both FDM (frequency division multiplexing) and TDM enabled by OFDMA (see frame 104). The overall bandwidth is divided into sub-carriers (e.g., $\lambda_1$, $\lambda_2$, and $\lambda_3$). Each optical network unit (ONU) 106 (e.g., ONU 1, ONU 2, ONU 3) is allocated one sub-channel including one or more sub-carriers (e.g., $\lambda_1$, $\lambda_2$, $\lambda_3$, ... ). Within this bandwidth, it can be further shared among different applications in either FDM or TDM mode. On the other hand, different ONUs 106 can share the same sub-channel using TDM, in case that one ONU does not have enough traffic to fill up the bandwidth provided by the sub-channel. The frequency and time domain joint scheme can realize a granular resource partition, while enabling all users to share the available bandwidth more efficiently.

FIG. 1 shows the OFDMA-PON architecture 100 with traffic between an optical line terminal (OLT) 108 and ONUs 106 organized by OFDMA frames 104. Within each frame 104, the sub-carriers (e.g., $\lambda_1$, $\lambda_2$, $\lambda_3$) are allocated to different ONUs 106 or applications. In one example, an application may include a business area 110 where Internet Protocol (IP) and TDM are employed. Another application may include a mobile telephone base station 112 and employ TDM. Yet another application may include a residential area 114 and employ IP. Other applications and format are also contemplated.

Dedicated sub-carriers (sub-channels 1 and 2, indicated by numbers 1 and 2 in FIG. 1) are allocated to the legacy TDM services to the business area 110 and mobile base station 112. The number of sub-carriers of each sub-channel depends on the bandwidth needed by the TDX links. The remaining bandwidth (sub-carriers) is allocated to IP traffic, shared among the ONUs 106 in TDM mode (business area 110 and residential are 114). The sub-carriers and time slot allocation are controlled by the OLT 108 and sent to the ONUs 106 by dedicated sub-carriers in pre-configured time slots as illustratively depicted in FIG. 2. An illustrative timeslot 125 is shown in greater detail in FIG. 2.

Figure 2:
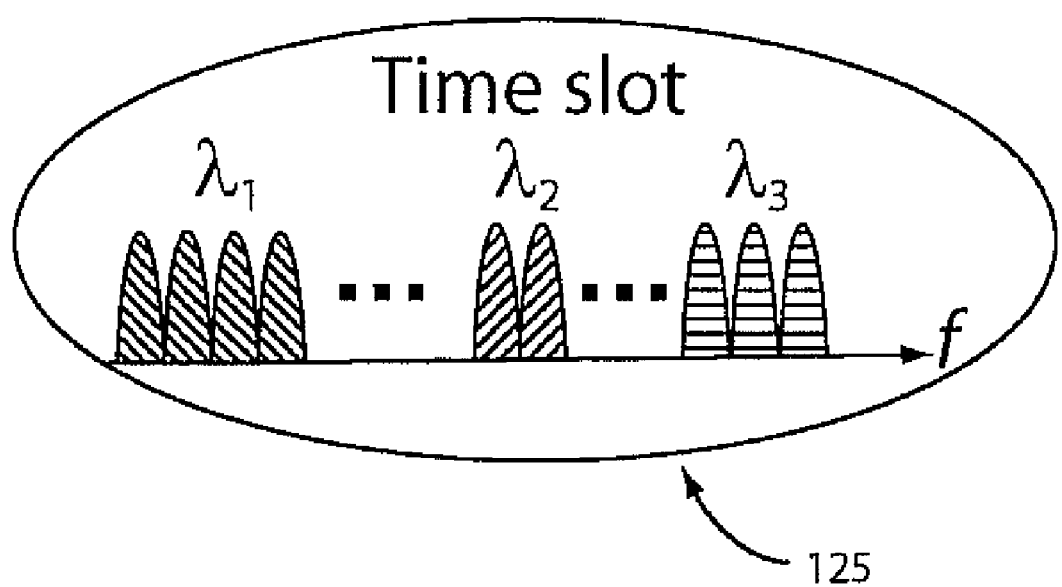
FIG. 2 is a diagram showing a single time slot having multiple sub carriers therein.

Referring to FIG. 2, a time slot 125 in frame 104 includes multiple sub-carriers (e.g., $\lambda_1$, $\lambda_2$, $\lambda_3$) in the same time slot 125. By permitting the addition of multiple sub-carrier frequencies and permitting time division multiplexing simultaneously a more flexible, dynamic, and efficient bandwidth allocation is achieved. Subcarriers may share a same timeslot, may share different time slots or one or more subcarriers may be divided into different time slots. In this way, components may be assigned a two-dimensional bandwidth area in frequency-time space. (see frame 104, FIG. 1, for example).

Referring again to FIG. 1, for upstream traffic (from areas 110, 112, 114), each ONU 106 maps the data to the given sub-carrier(s), sets all the other sub-carriers to zero, and completes the modulation to generate an OFDM frame which includes the same number of OFDM symbols as the number of total sub-carriers in the time domain. The OFDM frame 104 is then converted into optical OFDM symbols with a low cost Directly Modulated Laser (DML) at different wavelengths following a pre-decided schedule provided by the OLT 108 and transmitted out over fiber 120.

The optical OFDM symbols from multiple ONUs 106 will be combined at an optical coupler/splitter 122, forming a single OFDM frame 104, and detected by a single photodetector at the OLT receiver 108. Due to the orthogonal nature, there will be no interference among the signals from different ONUs. A different wavelength is preferably employed for each ONU 106 to avoid beating noise.

For downstream traffic, the OLT 108 encapsulates the data into the given sub-carriers and time slots according to frequency and time domain scheduling results, and then converts this information into the OFDM frame 104. When the traffic reaches the ONUs 106, each ONU 106 demodulates the OFDM frame 104 and picks out its own data from the proper sub-carrier(s) and time slots.

The dedicated sub-channels, which are composed of one or several sub-carriers become a transparent pipe for delivery of arbitrary digital or digitized analog signals for both circuit switched and packet switched systems. Sub-channels can handle lower data rates and burst data much more efficiently than TDM. Simultaneous uplink transmissions of multiple ONUs 106 can also save a laser on/off time window. Because the transparent pipes could be highly deterministic, they can transmit a media access control (MAC) layer data packet as physical layer (PHY) frames without overhead control messaging, which increases link efficiency and avoids complex packet scheduling or media access control schemes. The deterministic pipes also can minimize standard deviations of packet latency and inter-arrival time, which are extremely important for performance of multimedia stream and pseudo wire applications. In addition, each ONU 106 can implement different modulation and security schemes with simple PHY architectures.

In one illustrative embodiment, by applying m-QAM modulation (Quadrature Amplitude Modulation), relatively low speed (e.g., 2.5 GHz) optical components can be used to provide high speed (e.g., 10 Gbps) throughput, and high spectrum efficiency can be achieved without complicated time domain equalization. Due to the frequency domain equalization, OFDMA-PON is robust to frequency dependent distortion caused by fiber dispersion and frequency ripple caused by low cost components. In addition, due to the processing in the digital domain, tuned sub-channel receiver filters are not needed in OFDMA-PON as in conventional sub-carrier multiplexing.

The architecture 100 is also useful for longer reach applications, for example, 80 km-100 km or more. This is due in part to the robustness to distortion and reduction in costs since expensive 10 Gb/s components that increase the system costs are not needed. Because of the flexible bandwidth assignment based on the sub-carriers and the independency of the modulation format for each sub-carrier, when used under combined short and long reach conditions, we can have 16 QAM and QPSK (Quadrature Phase Shift Keying) modulation for the short and long reach ONUs separately.

The advantages of OFDMA-PON architecture 100 include: Two-dimensional (frequency, time) resource allocation achieves a granular (well-defined) resource partition, while enabling all users to share pipes more efficiently. Sub-channels create transparent pipes for both circuit switched and packet switched systems. Transparent pipes can also enable easy implementation of different modulation and security schemes to different ONUs with a simple PHY architecture.

Transparent pipes can transmit MAC layer data packets as PHY frames without overhead control messaging, which increases link efficiency and avoids complex packet scheduling or media access control schemes. It also can minimize standard deviations of packet latency and inter-arrival time, which are extremely important for performance of multimedia stream and pseudo wire applications.

Because each ONU transmits at different sub-carriers independently, there is no need for a common timing reference among all ONUs. High spectrum efficiency (such as m-QAM modulation scheme) can be achieved without complicated time domain equalization. Due to the frequency domain equalization, OFDMA-PON is robust to frequency dependent distortion caused by the fiber dispersion and the frequency ripple problem caused by low cost components.

Split sub-channels can handle lower data rates and burst data much more efficiently than OFDM with TDMA. Simultaneous uplink transmissions of multiple ONUs can also save laser on/off time windows. Unlike in conventional sub-carrier modulation (SCM), tuned sub-channel receiver filters are not needed.

Figure 3:
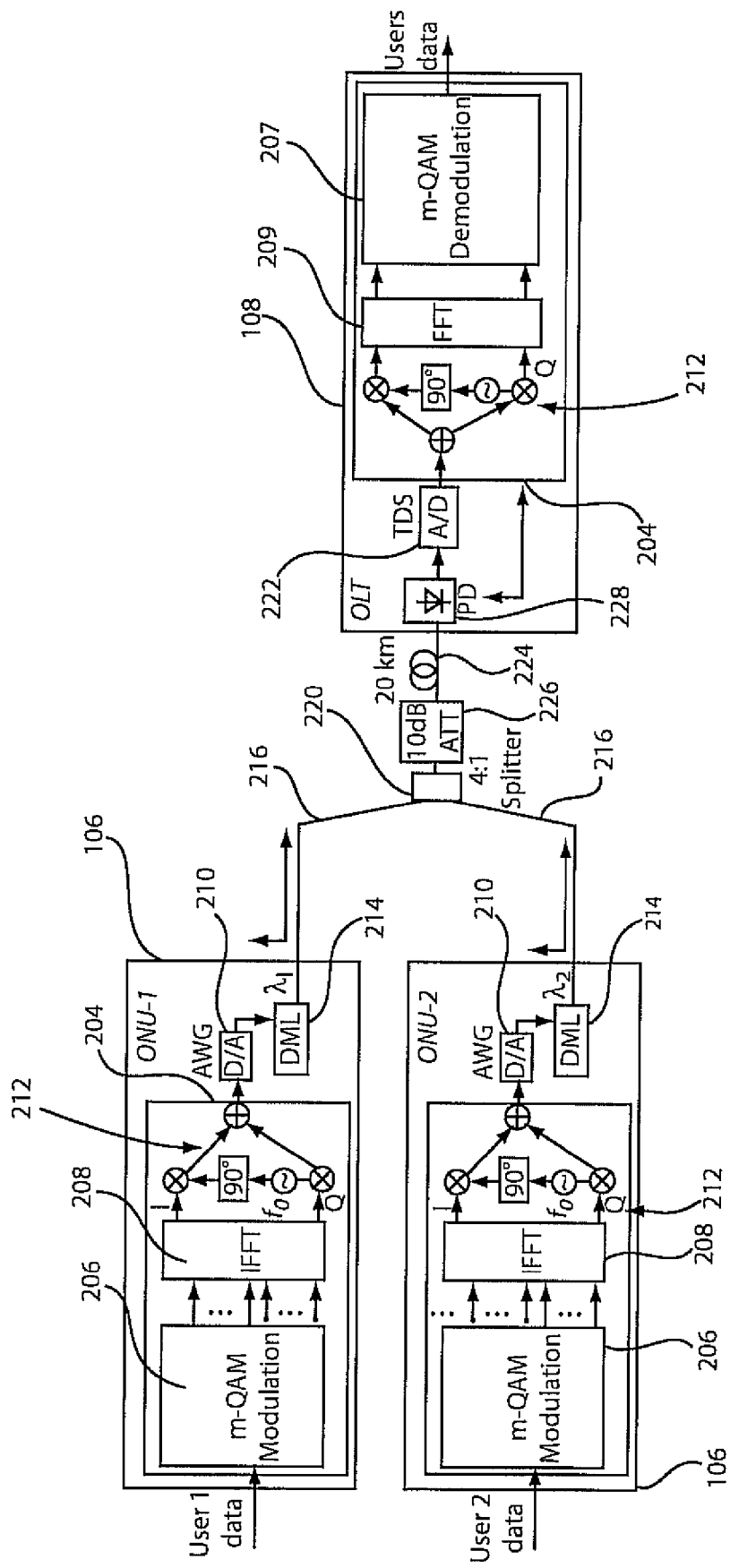
FIG. 3 is a schematic diagram showing an illustrative passive optical network architecture for a system and method for Orthogonal Frequency Division Multiple Access (OFDMA) employed in obtaining experimental results in accordance with another exemplary embodiment.

Referring to FIG. 3, an experimental setup of upstream traffic to validate the architecture 100 is illustratively shown. The OFDMA frames are made up of sub-carriers allocated in the frequency domain and time domain. For both upstream and downstream traffic in OFDMA-PON, 256 sub-carriers are split into 2 sub-channels (128 sub-carriers each) and each sub-channel is assigned to one ONU 106 (ONU-1 or ONU-2). The OFDM signals are generated by using, e.g., a Tektronix™ Arbitrary Waveform Generator (AWG7002) 210 as an OFDM transmitter. The 16 QAM modulated OFDM waveforms are first generated by a Matlab™ program 204 with digital I-Q modulation and two times up-sampling. The m-QAM modulation 206, IFFT 20B and sampling/mixing 212 were provided by the program in block 204. Cyclic prefix (CP) was set to ⅟₃₂. Those digital waveforms are then imported into AWG 210 operated at 10 GSps to generate the 2.5 GHz bandwidth (10 Gbps) OFDM signals. A Directly Modulated Laser (DML) 214 outputs optical signals for a particular sub-carrier ($\lambda_1$ or $\lambda_2$) employing TDM as well onto fibers 216.

For the downstream direction, a single AWG 222 output channel was employed to emulate the traffic from one OLT 108 to two ONUs 106. For the upstream direction, two AWG output channels 210 were used to emulate the traffic from both two ONUs 106 to one OLT 108. The upstream traffic passed through a 4:1 coupler 220, 20 km fiber 224 and one 10 dB attenuator 226 (equal to a 1:32 splitter) to reach the OLT 108, which is emulated by a photo-detector 228, Tektronix™ real time scope 222 (TDS6154C, for A/D converting) and the Matlab™ program 204, which provided sampling 212, FFT 209 and m-QAM demodulation 207.

In this setup, two DMLs 214 are used at the ONUs transmitters. The laser wavelengths of ONU-1 and ONU-2 are set to 1540.91 nm and 1539.52 nm, respectively. The output power of the modulators could be changed from 0 dBm to 5 dBm. The received power falls within −16 dBm to −19 dsm if we count 3~4 dB attenuation from 20 km fiber 224, 6 dB attenuation from 4:1 coupler 220 and 10 dB from attenuator 226.

Experimental Results: received upstream and downstream OFDMA signals spectrums were determined. The 1.25 GHz-2.5 GHz frequency bandwidth (sub-carriers 1~128) are assigned to ONU-1, while frequency 0~1.25 GHz (sub-carriers 129-256) are assigned to ONU-2. In the upstream direction, a small guard band is put between two ONUs' signals to minimize the inter-carrier interference (ICI) due to the non-linear components. The downstream traffic did not have such guard band. 16-QAM modulation was employed during the whole experiment, so each ONU has a nominal data rate 5 Gbps.

This can be changed by assigning a different number of sub-carriers to the sub-channel of each ONU. The maximum data rate for one ONU is 10 Gbps when all 256 sub-carriers are assigned to it. When there are more than two ONUs, the number of sub-channels can be changed correspondingly. The experimental system can support up to 200 simultaneous ONUs with 50 Mbps each.

The BER was calculated based on different received powers for single ONU-1, single ONU-2, and for simultaneous ONU-1 and ONU-2 transmission.

Figure 4:
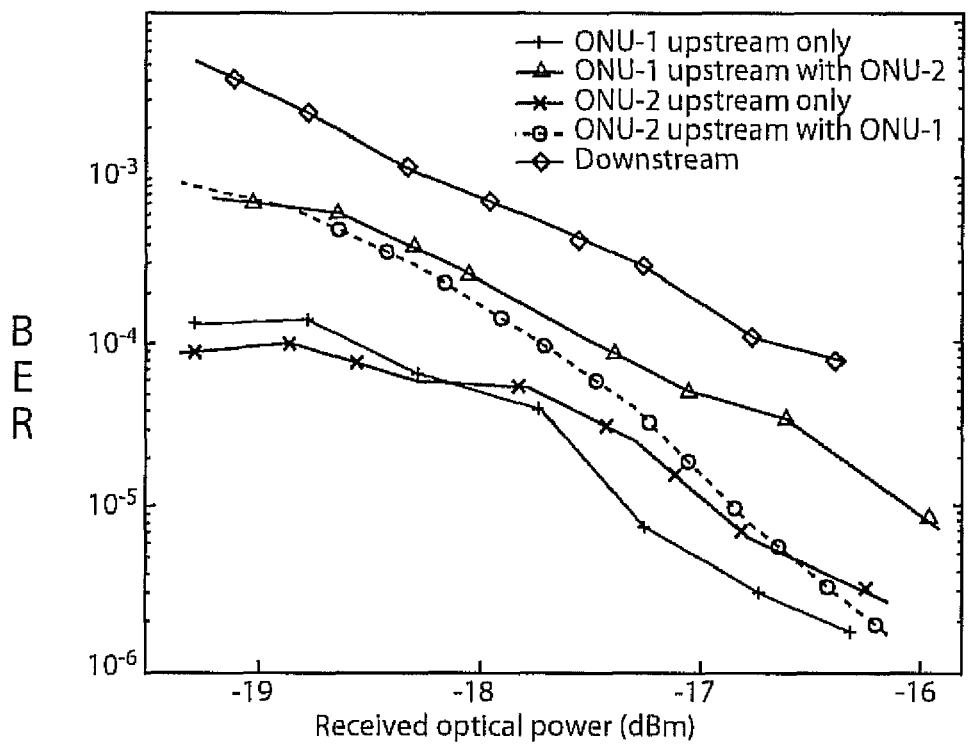
FIG. 4 is graph showing bit error rate (BER) versus received optical power for ONU-1 upstream only, ONU-1 upstream with ONU-2, ONU-2 upstream only, ONU-2 upstream with ONU-1, and downstream for the configuration in FIG. 3.
Figure 5:
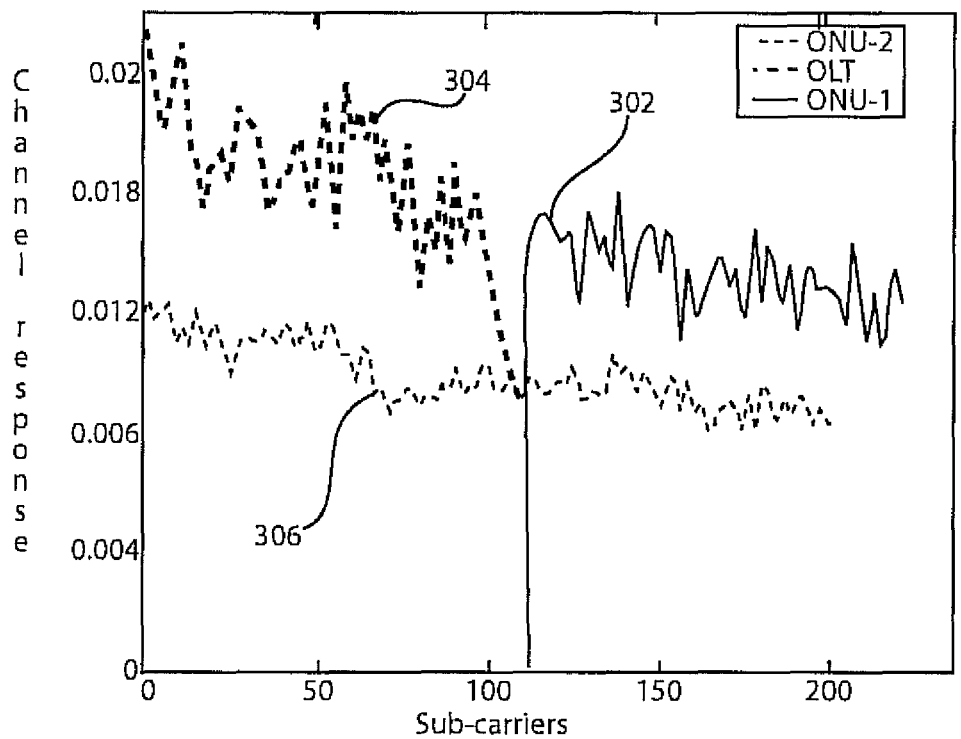
FIG. 5 is a graph of channel response versus number of subcarriers for ONU-1, OLT and ONU-2 for the configuration shown in FIG. 3.

Referring to FIG. 4, ONU-1 and ONU-2 BER performance is shown. A BER of $10^{-3}$ or smaller can be obtained at the received optical power −18.5 dBm or higher. This represents an excellent transmission performance where a BER of $10^{-9}$ or less is obtained with the help of forward error correction (FEC). FIG. 5 shows the channel response for simultaneous ONU-1 and ONU-2 upstream and OLT downstream transmissions. A least square (LS) channel estimation is used to find the channel response curves. Curve 302 is the channel response for ONU-1, while curve 304 is the channel response for ONU-2 during the same transmission time slots. Dash-dot curve 306 is the channel response for the OLT. The channel response results are one important factor to do the frequency domain equalization.

Using the same experimental setup, we also successfully transmitted 10 Gb/s data rate over 100 km fiber link without dispersion compensation and optical amplifier, while achieving $10^{-3}$ BER performance. The architecture 100 (FIG. 1) offers independence from the modulation format for each sub-carrier, which means that we can have either 16 QAM (for short reach ONU) and QPSK modulation (for long reach).

For a OFDMA-PON architecture, an experimental demonstration of 10 Gbps optical OFDM-A transmission in 2.5 GHz bandwidth has been shown. Long reach transmission over 100 km without any dispersion compensation is also demonstrated. High spectrum efficiency (>3 bits/Hz) is achieved with 16-QAM modulation. A two ONUs and one OLT system can transmit bidirectional traffic simultaneously with good BER performance since the impact of fiber dispersion and frequency ripple has been eliminated by frequency domain equalization. The architecture can provide transparent pipes for heterogeneous services traffic over extended reaches and offers bandwidth throughput improvement and more efficient bandwidth assignment.

Having described preferred embodiments of a system and method for orthogonal frequency division multiple access (OFDMA) based passive optical network (PON) architecture and its extension to long distances (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A passive optical network (PON) device, comprising:
   an optical line terminal (OLT) receiver configured to receive multiple signals at different optical wavelengths simultaneously and enable multiple transmitters to operate at the same time during one upstream time slot, wherein the OLT is coupled to a plurality of optical network units (ONUs) and the ONUs are each assigned a different wavelength;
   wherein the optical line terminal employs Orthogonal Frequency Division Multiple Access (OFDMA) to transparently support a plurality of applications and enable dynamic bandwidth allocation among these applications where the bandwidth is allocated in two dimensional frequency and time space, such that bandwidth for a given frequency is allocated across multiple optical wavelengths and wherein the OLT and the ONUs exchange OFDMA frames that include allocated areas in both time and frequency for each ONU.

2. The device as recited in claim 1, wherein the OLT includes a directly modulated laser (DML) for each of a plurality of wavelengths.

3. The device as recited in claim 2, wherein the (DML) transmits signals over at least 80 kilometers without dispersion compensation.

4. The device as recited in claim 1, wherein the OLT achieves 10 Gb/s operation using 2.5 Gb/s components.

5. The device as recited in claim 1, wherein the OLT includes an inverse fast Fourier transform for scheduling bandwidth in accordance with ONU requirements.

6. The device as recited in claim 1, wherein the optical wavelengths are spaced to avoid beating noise.

7. A passive optical network (PON) network, comprising:
an optical line terminal (OLT) receiver configured to receive multiple signals at different optical wavelengths simultaneously and enable multiple transmitters to operate at the same time during one upstream time slot;
a plurality of optical network units (ONUs) coupled to the OLT over a fiber link, each ONUs associated with an application and assigned a different wavelength;
wherein communications between the OLT and the ONUs employ Orthogonal Frequency Division Multiple Access (OFDMA) to transparently support the applications and enable dynamic bandwidth allocation among these applications where the bandwidth is allocated in two dimensional frequency and time space, such that bandwidth for a given frequency is allocated across multiple optical wavelengths, and
wherein the OLT and the ONUs exchange OFDMA frames that include allocated areas in both time and frequency for each ONU.

8. The network as recited in claim 7, wherein the OLT includes a directly modulated laser (DML) for each of a plurality of wavelengths.

9. The network as recited in claim 8, wherein the (DML) transmits signals over at least 80 kilometers without dispersion compensation.

10. The network as recited in claim 7, wherein the OLT achieves 10 Gb/s operation using 2.5 Gb/s components.

11. The network as recited in claim 7, wherein the OLT includes an inverse fast Fourier transform for scheduling bandwidth in accordance with ONU requirements.

12. A method for communication over a passive optical network (PON), comprising:
providing an optical line terminal (OLT) receiver configured to receive multiple signals at different optical wavelengths simultaneously and enable multiple transmitters to operate at the same time during one upstream time slot that is coupled to a plurality of optical network units (ONUs);
assigning a different wavelength to each of the plurality of optical network units (ONUs) in communication with the OLT; and
forming Orthogonal Frequency Division Multiple Access (OFDMA) frames to transparently support a plurality of applications and enable dynamic bandwidth allocation among these applications where the bandwidth is allocated in two dimensional frequency and time space, such that bandwidth for a given frequency is allocated across multiple optical wavelengths, and
wherein the OLT and the ONUs exchange OFDMA frames and further comprising allocating areas in both time and frequency for each ONU.

13. The method as recited in claim 12, wherein the OLT includes a directly modulated laser (DML) for each of a plurality of wavelengths and further comprising transmitting signals over at least 80 kilometers without dispersion compensation.

14. The method as recited in claim 12, wherein the OLT includes an inverse fast Fourier transform, and further comprising for scheduling bandwidth in accordance with ONU requirements.

* * * * *